May 11, 1954 G. D. FORBES 2,678,349

PERIODIC LINE INTERRUPTION WITH VERTICAL ALIGNMENT OF SEGMENTED PORTIONS OF KINESCOPE RASTER

Filed Sept. 14, 1949 5 Sheets-Sheet 1

Inventor
Gordon Donald Forbes
by Rines and Rines
Attorneys

Inventor
Gordon Donald Forbes
by Rines and Rines
Attorneys

May 11, 1954　　　G. D. FORBES　　　2,678,349

PERIODIC LINE INTERRUPTION WITH VERTICAL ALIGNMENT OF SEGMENTED PORTIONS OF KINESCOPE RASTER

Filed Sept. 14, 1949　　　5 Sheets-Sheet 3

Inventor
Gordon Donald Forbes
by Rines and Rines
Attorneys

Inventor
Gordon Donald Forbes
by Rines and Rines
Attorneys

Inventor
Gordon Donald Forbes
by Rines and Rines
Attorneys

Patented May 11, 1954

2,678,349

UNITED STATES PATENT OFFICE 2,678,349

PERIODIC LINE INTERRUPTION WITH VERTICAL ALIGNMENT OF SEGMENTED PORTIONS OF KINESCOPE RASTER

Gordon Donald Forbes, Sudbury, Mass.

Application September 14, 1949, Serial No. 115,744

2 Claims. (Cl. 178—7.5)

Figure 1:
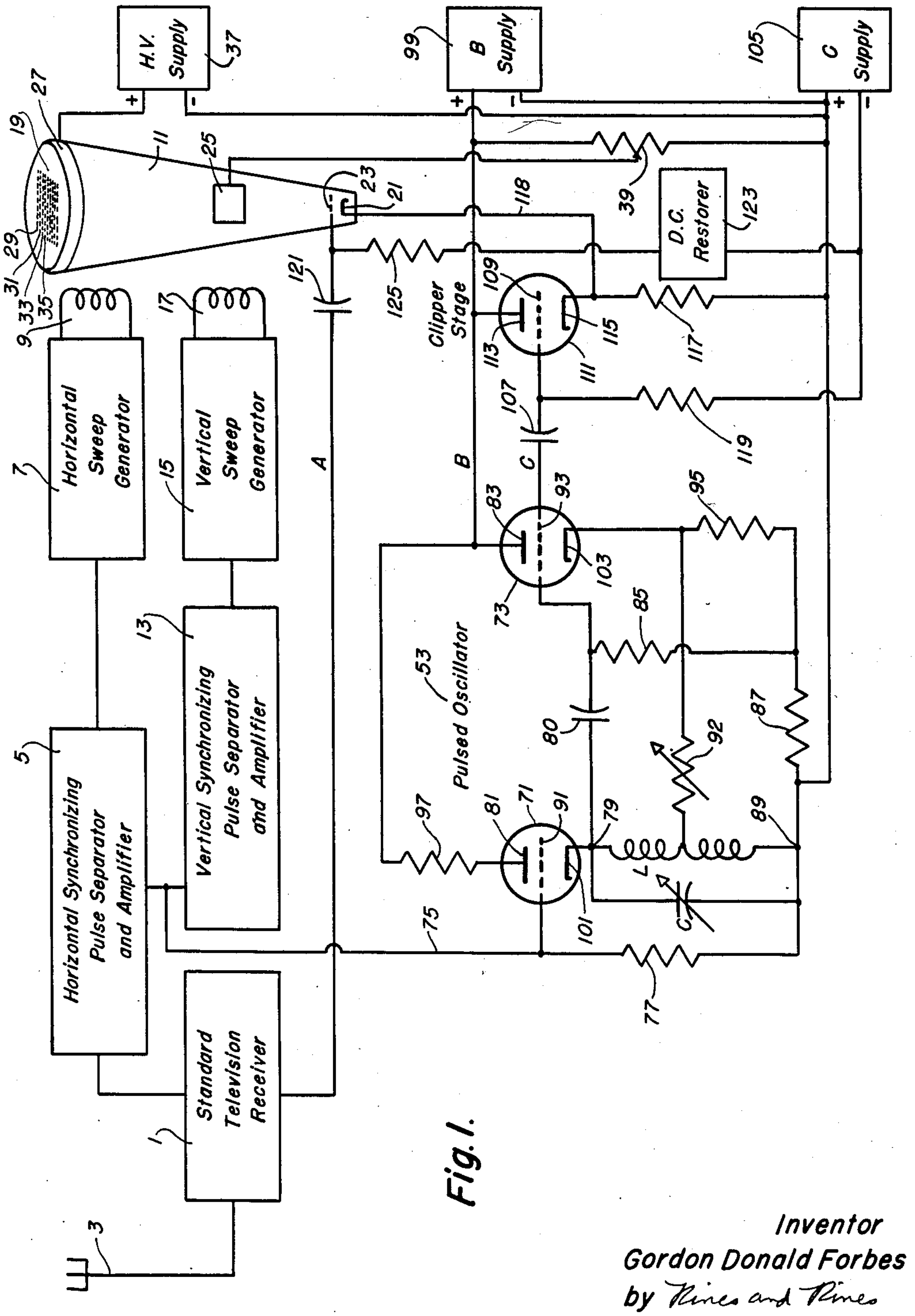

The present invention relates to cathode-ray-tube presentations, and more particularly to television systems employing cathode-ray-tube displays.

An object of the present invention is to provide a new and improved method of and system for cathode-ray-tube presentation.

Another object is to provide a novel method of and system for television presentation.

Still another object is to provide a method of and system for producing signals for a cathode-ray-tube presentation.

In accordance with present-day television techniques, a picture is reproduced upon a cathode-ray-tube screen by intensity-modulating successive horizontal electron-beam scans that are substantially equally vertically displaced. The reproduced picture presents, of necessity, the appearance of parallel lines resulting from the successive horizontal scans. These lines detract from the appearance of the picture and from the enjoyment of the audience. They are quite disturbing in enlarged-tube and projection-television displays. It has heretofore been proposed to eliminate these disturbing effects by breaking up the line scans into dots as by producing alternating voltages for periodically blanking the electron stream or halting the deflection process. Such systems, however, do not insure that every scan is broken up in exactly the same manner, so that the appearance of the resulting shifting dots is equally disturbing to the viewer.

A further object of the present invention is to overcome this undesirable parallel-line-picture appearance, and, more desirably, to present a picture the line scans of which are divided into a plurality of uniform closely spaced dots too small to be individually discernable and which preferably assume exactly the same position along each line scan.

An additional object is to provide a system for accomplishing this purpose in the form of a modification kit that may be added to present-day television receiver systems.

Still another object of the present invention is to provide a new method and system of more general use for dividing a two-dimensional cathode-ray-tube scanning pattern into a plurality of closely spaced dots.

Other and further objects will be explained hereinafter and will be more particularly pointed out in the appended claims.

In summary, the present invention relates to a method of and system for cathode-ray-tube presentation that comprises producing a two-dimensional electron-beam scanning pattern and accurately dividing successive elements of the scanning pattern along one of the dimensions into precisely the same pattern of a plurality of small, closely spaced dots. In a television system, for example, this end may be achieved by producing, in response to the horizontal or vertical scanning synchronizing signals, a train of periodic, short cathode-ray blanking pulses for periodically interrupting or blanking the electron beam during its successive horizontal scans. Preferred systems for producing the blanking pulses either at the television transmitter or receiver are hereinafter described in detail.

Figure 2:
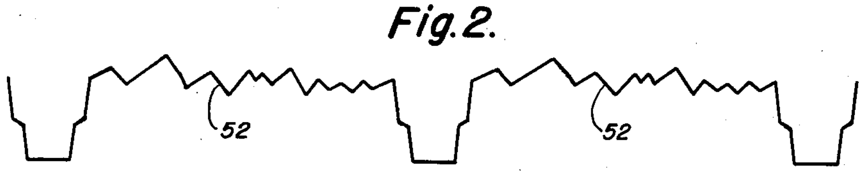
Figure 3:
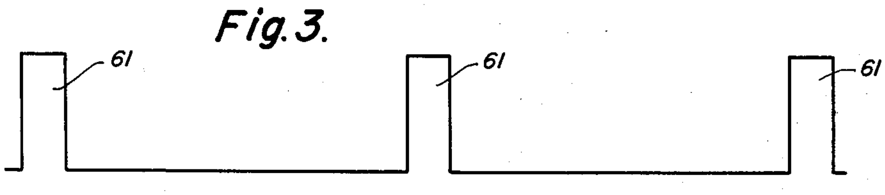
Figure 4:
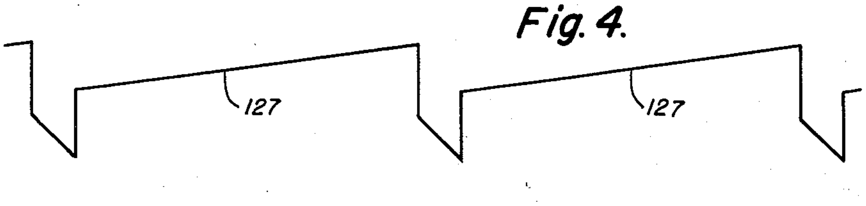
Figure 5:
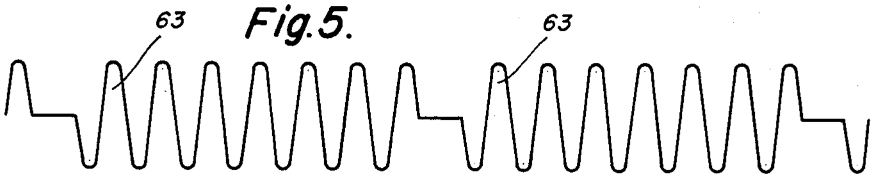
Figure 6:
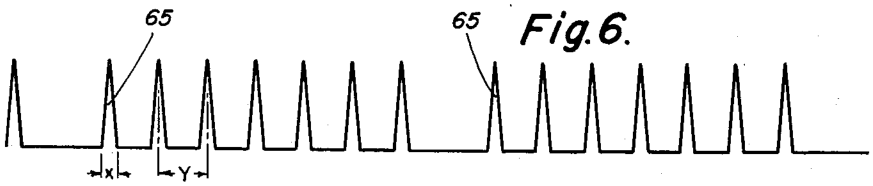
Figures 7, 8:
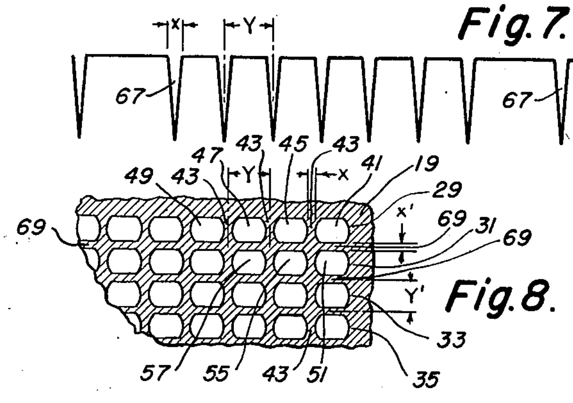
Figure 9:
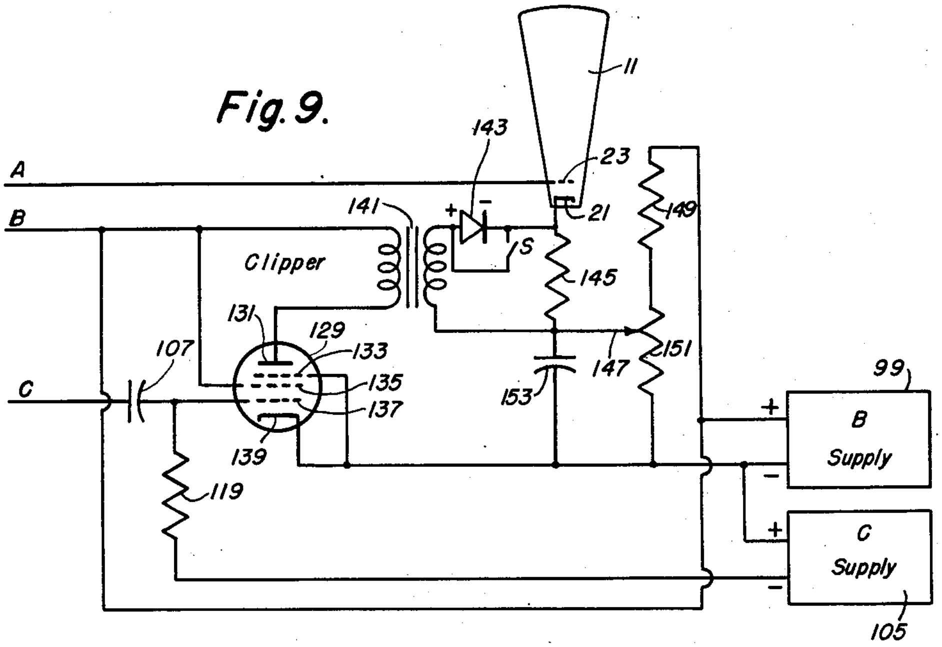
Figure 10:
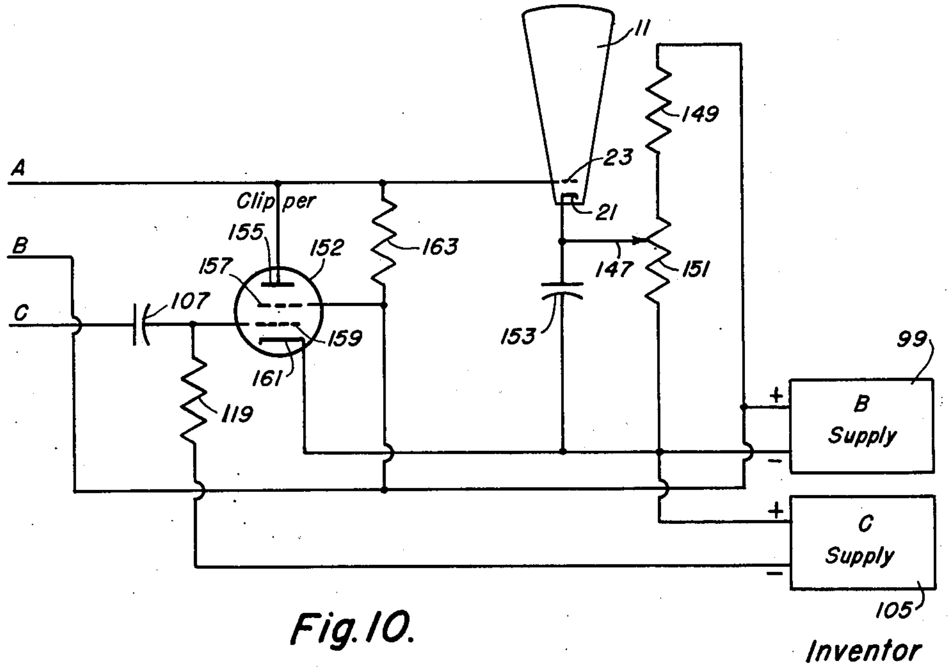
Figure 11:
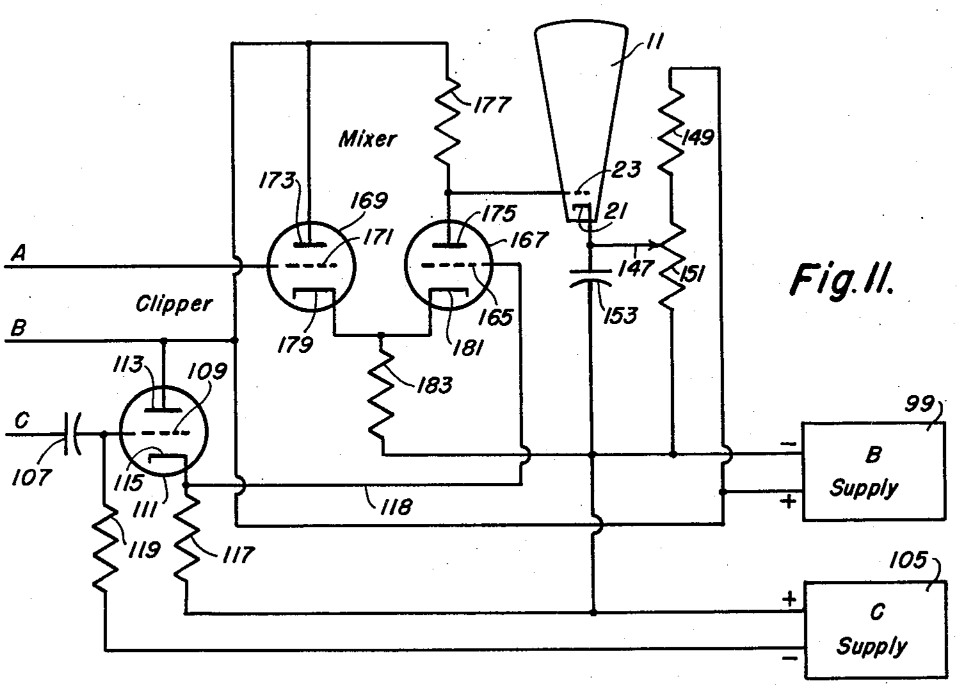
Figure 12:
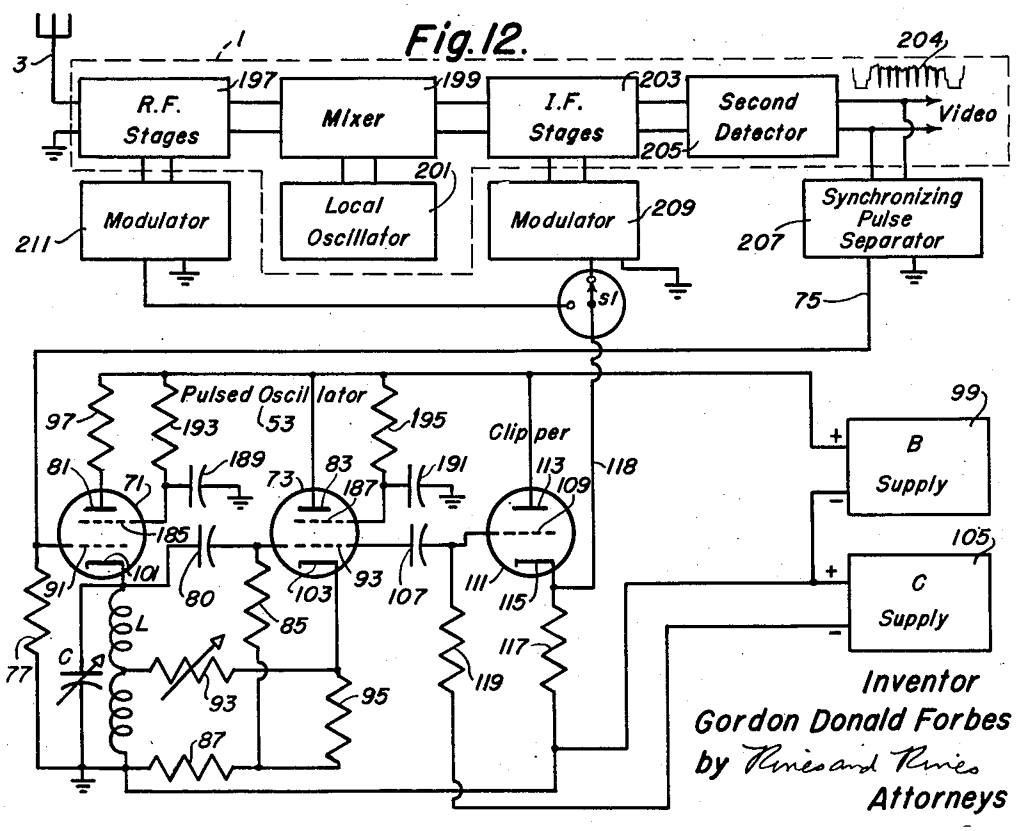
Figure 13:
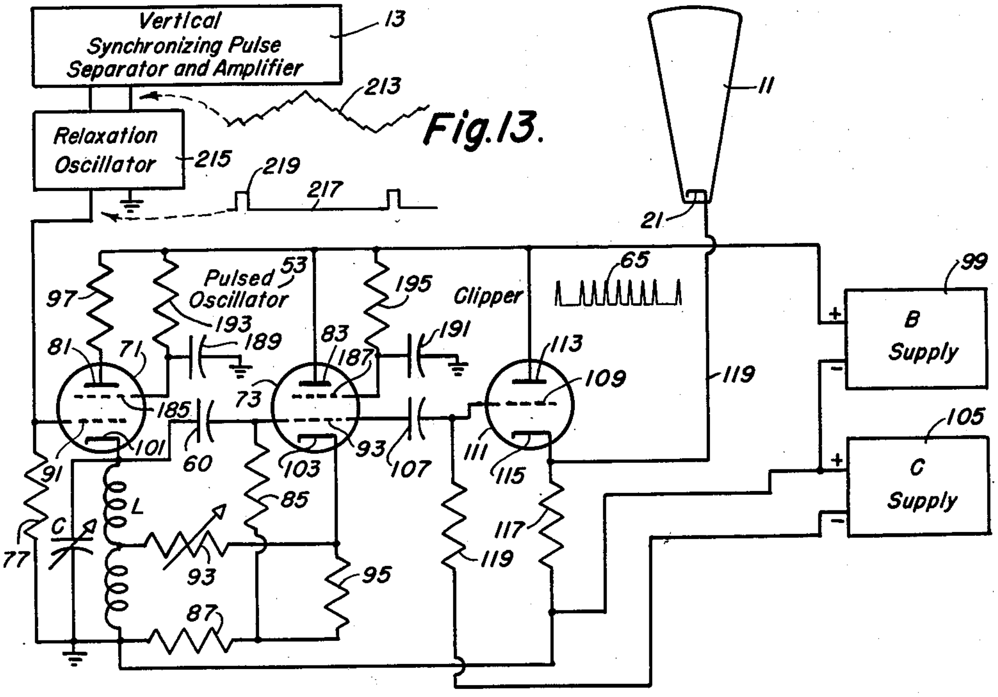
Figure 14:
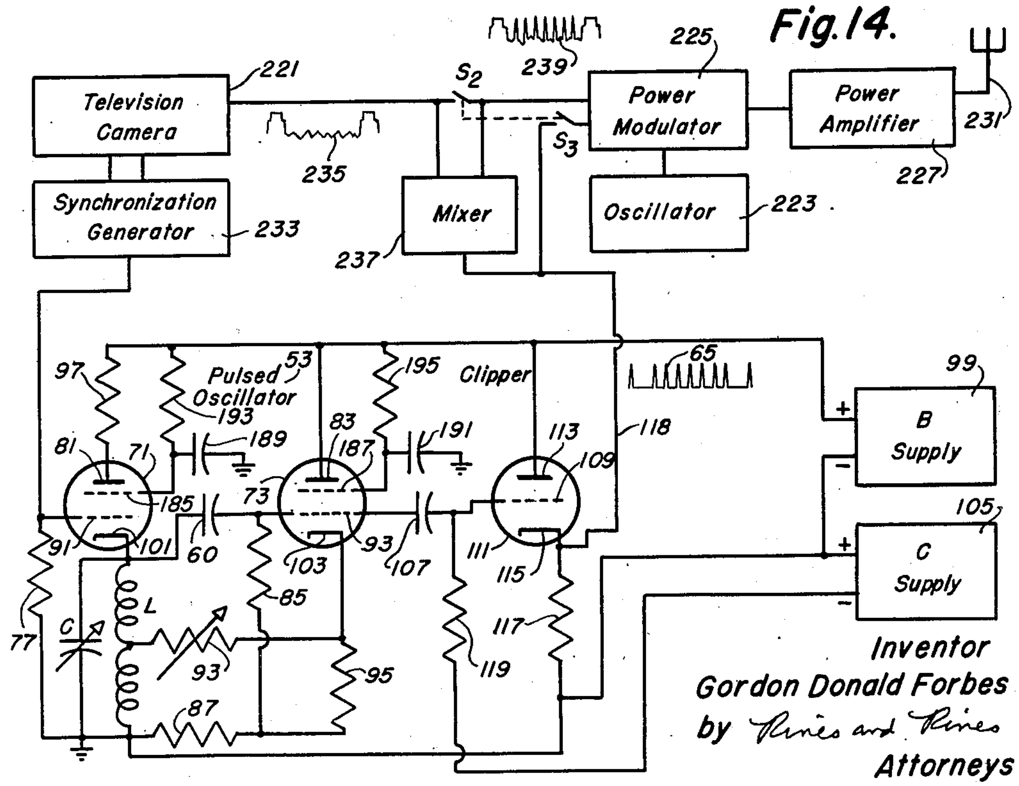

The invention will now be more fully described in connection with the accompanying drawings Fig. 1 of which is a schematic diagram of circuits and apparatus constructed in accordance with a preferred embodiment of the invention as applied to a television receiving system; Figs. 2 to 7 are explanatory wave-form diagrams illustrating the timing of the operation of the various circuits of Fig. 1, Fig. 2 showing the standard video-signal output applied to the presentation cathode-ray tube or kinescope, Fig. 3 illustrating the horizontal-sweep or scan synchronizing signals, Fig. 4 illustrating the output of the horizontal sweep or scan generator, Fig. 5 illustrating a train of oscillations produced by a pulsed oscillator in response to each horizontal-scan synchronizing signal, Fig. 6 illustrating rectified or unidirectionalized portions of the oscillations of Fig. 5 that are employed as blanking pulses, and Fig. 7 illustrating phase-inverted blanking pulses corresponding to those of Fig. 6; Fig. 8 is a greatly enlarged view of a portion of the fluorescent screen of the presentation cathode-ray tube of Fig. 1; Figs. 9, 10 and 11 are modifications of the circuits shown in Fig. 1 for applying the blanking pulses to the cathode-ray tube; Fig. 12 is a view of a further modification in which the pulsed oscillator and associated circuits are applied to the radio-frequency or intermediate-frequency radio-receiving circuits of the television receiver instead of being applied to the cathode-ray-tube proper, as shown in Fig. 1; Fig. 13 is a schematic diagram of still another modification in accordance with which the vertical-scan synchronizing pulses are employed instead of the horizontal-scan synchronizing pulses to produce the train of oscillations that are converted, in accordance with the present invention, into blanking pulses; and Fig. 14 is a further modification illustrating the application of the circuits of Figs. 12 and 13 to a television transmitting system.

Referring first to Fig. 1, a standard television receiver 1 is shown receiving radio-frequency transmissions picked up in an antenna 3. Associated with present-day commercial television receivers are synchronizing signal-separator-and-amplifier circuits that produce synchronizing impulses for triggering the horizontal and vertical sweep or scanning circuits associated with the television cathode-ray-tube display. A conventional horizontal-scan synchronizing pulse separator-and-amplifier 5 is shown feeding horizontal-scan synchronizing signals 61, Fig. 3, to the horizontal sweep or scan generator 7 to produce, at a predetermined frequency, horizontal scan voltages 127, Fig. 4. The horizontal sweep generator 7, in turn, is shown energizing conventional horizontal deflection means such as, for example, the coils 9 that may be associated with the presentation cathode-ray tube or kinescope 11. Similarly, a conventional vertical synchronizing pulse separator-and-amplifier 13 is shown feeding vertical-scan synchronizing signals of a lower frequency to a conventional vertical sweep or scan generator 15 that may energize vertical deflection means such as the coils 17 associated with the cathode-ray tube 11.

It is to be understood that the cathode-ray or electron-beam deflection means 9—17 may comprise, also, electrostatic plates instead of coil deflectors, or that a combination of electrostatic and magnetic deflection means may be employed, as is well-known in the art. The coils 9 and 17, moreover, are, in actual practice, oriented at right angles to each other about the neck of the cathode-ray tube 11, the showing in Fig. 1 being only schematic in order not to complicate the drawings.

The cathode-ray tube 11 is schematically shown comprising a fluorescent viewing screen 19 at one end, and an electron-beam-producing gun comprising an electron-emissive cathode 21, a control-grid electrode 23 and an anode 25, at the other end. The electron beam may be focused, as is well known in the art, by conventional electrostatic or magnetic focusing means, not shown.

A final anode 27 comprising a metal cathode-ray tube neck or a conductive coating on the neck of the cathode-ray tube 11 is provided to impinge the electron-beam produced by the above-mentioned electron gun upon the fluorescent viewing screen 19. The electron beam so impinged becomes actuated or deflected along one dimension, shown horizontal, by the horizontal-sweep currents in the coil 9. Successive horizontal scans are produced, moreover, at a plurality of positions spaced from one another a predetermined distance along a second dimension, shown vertical, in response to the action of the vertical-sweep voltage in the coil 17, so that the electron beam describes successive horizontal-line scans 29, 31, 33, 35, etc., on the fluorescent screen 19, each vertically displaced from the preceding horizontal-line scan. A conventional high-voltage supply source 37 is shown feeding positive voltage to the final anode 27 of the cathode-ray tube 11 and a relatively negative voltage by way of a potentiometer 39 to the anode 25.

The precise details and circuits of the receiver 1, the horizontal and vertical synchronizing pulse separators-and-amplifiers 5 and 13, the horizontal and vertical sweep or scan generators 7 and 15, the horizontal and vertical deflection means 9 and 17, the presentation cathode-ray tube 11, and the voltage supply system 37, 39, etc., may be found fully described, for example, in Principles of Television Engineering, by Donald G. Fink, McGraw-Hill Book Company, 1945.

The intensity of the scanning electron beam is continuously modulated in accordance with the light and dark portions of the television picture by feeding the television video signals 52, Fig. 2, received by the receiver 1 to, for example, the control grid 23 of the cathode-ray tube 11. Video signals may equally well be fed to the cathode 21 or to other electrodes, as is well known. Successive horizontal scans 29, 31, 33, 35, etc., therefore, become intensity-modulated to reproduce the corresponding light and dark areas of the televised object, thereby producing a television image on the screen 19.

In a properly adjusted television receiving system, however, the successive horizontal lines forming the television image on the screen 19 are disturbing to the viewer. This is particularly the case for tubes having large diameter screens 19 and for projection systems in which the television image on the screen 19 is projected upon still a larger screen.

In accordance with the present invention, therefore, the intensity-modulated horizontal lines upon the cathode-ray tube screen 19 are accurately broken up into fine dots too small individually to be discernable, somewhat in the fashion of a half-tone picture. The television image presented upon the screen 19 becomes thus converted into what appears to be a perfect picture, without the disturbing appearance of horizontal lines.

In Fig. 8, for example, a corner of the fluorescent screen 19 of the presentation cathode-ray tube 11 of Fig. 1 is illustrated displaying portions of the successive horizontal scans 29, 31, 33 and 35 on a greatly magnified scale. Each scan is shown broken up into a plurality of closely spaced dots. The shaded portion of the screen 19 indicates dark areas where the electron beam has not impinged, and the unshaded dots represent areas where the electron beam has impinged on the screen. The first or top-most horizontal scan 29, for example, comprises the light areas or dots 41, 45, 47, 49, and so on, each light area being horizontally separated from adjacent light areas by a dark area 43 of horizontal width X. Similarly, the next horizontal scan 31 is shown broken up into light areas or dots 51, 55, 57, and so on, the dots being separated from one another by the same dark areas 43. In like manner, the horizontal scans 33, 35, and so on, are divided into a plurality of closely spaced light areas or dots. It is desirable, though not essential, that the horizontal width X of the dark areas 43 between the light dots be of the same order of magnitude as, and preferably substantially the same as, the predetermined vertical width X′ of the dark regions 69 between the successive horizontal scans 29, 31, 33, 35, etc., produced in response to the action of the vertical deflection means 17. Similarly, the horizontal dimension of each dot may be adjusted to a value of the same order of magnitude as the vertical width of each horizontal scan. The dots or light areas into which the successive horizontal scans are divided are shown having somewhat curved ends since, in actual practice, an electron beam can not be sharply interrupted. In Fig. 8, the letter Y represents the horizontal distance between the centers of successive dark areas 43, which is the same as the horizontal distance between the centers of the successive dots. The letter Y' indicates the vertical distance between the centers of successive dark areas 69 which is the same as the vertical distance between the centers of successive horizontal scans. In the above-described mode of operation, therefore, the ratio of X to Y will be of the same order of magnitude as the ratio of X' to Y'.

While the invention has thus far been described in connection with horizontal and vertical electron-beam scanning, it is to be understood that the invention is not so limited, being equally applicable to any two-dimensional scanning pattern, such as concentric circles, a spiral, and other well-known cathode-ray scanning configurations. The terms "horizontal" and "vertical," moreover, are intended to cover any two-dimensional pattern having substantially parallel-line scans, whether or not the scans are actually oriented parallel to the horizon.

It now remains to describe how the two-dimensional cathode-ray-tube presentation upon the screen 19 of the cathode-ray tube 11 may be divided or broken up along one of the dimensions into a plurality of small closely spaced dots.

This is preferably effected by producing a train of short blanking pulses that may periodically interrupt the cathode-ray-tube electron beam during its scanning along one dimension of the two-dimensional scanning pattern. The blanking pulses may be produced with the aid of the circuit illustrated in Fig. 1, comprising a pulsed clamped oscillator 53 that may be triggered or pulsed in response to the same horizontal synchronizing pulses 61 from the horizontal pulse separator-and-amplifier 5 that trigger the horizontal sweep generator 7, to produce a train of oscillations 63 of frequency much greater than the horizontal scan frequency for the duration of each horizontal scan voltage 127. Successive horizontal synchronizing pulses are shown at 61 in Fig. 3, in timed relation with the corresponding horizontal sweep or scan voltages 127 of Fig. 4, and the corresponding train of oscillations 63, Fig. 5, produced by the pulsed oscillator 53. In actual practice, as later discussed, there may be more oscillations during each horizontal scan than are shown, say 700 oscillations, more or less. These successive trains of oscillations 63 may be clipped, rectified or otherwise unidirectionalized in any desired manner as by means of a clipper stage 111, and may then be applied to the cathode 21 of the cathode-ray tube 11, periodically to drive it positive and thereby periodically to blank or interrupt the electron beam produced in the cathode-ray-tube 11 during each horizontal scan. Such clipped or rectified impulses are shown at 65 in Fig. 6. They may be inverted, however, as shown at 67 in Fig. 7, for application to the grid 23 of the cathode-ray-tube 11, periodically to drive the grid negative, thereby periodically to interrupt or cut-off the electron beam during its successive horizontal scans. It is to be understood, of course, that the anode and other cathode-ray-tube electrodes may similarly be pulsed, if desired, to blank the electron stream, though it is preferable to feed the blanking pulses to the cathode or control grid of the electron-beam-producing gun.

The duration of the unidirectionalized blanking pulses 65 or 67, Figs. 6 and 7, may be equal to the half cycle of the oscillations 63 of Fig. 5, or they may be more or less than the half-cycle, depending upon the biasing of the clipper stage 111 or other unidirectionalizing system. The duration or width of the blanking impulses 65 or 67 is indicated by the same letter X employed in Fig. 8 to connote the width of the dark spacings or areas 43 between successive electron-beam light areas or dots, since the period of interruption or blanking of the electron beam is determined by the duration of the blanking pulse. The horizontal distance between centers of successive blanking pulses 65 or 67 is indicated by the same letter Y used to connote the corresponding horizontal distance, in Fig. 8, between the centers of successive dark areas 43 on the cathode-ray-tube screen 19.

The pulsed oscillator may be of any desired form, such as shock-excited and ringing circuits. It is preferably, however, of the type described, for example, on page 143 of "Wave Forms," Radiation Laboratory Series No. 19, McGraw-Hill, 1948. A circuit similar to this particular type of oscillator is shown in Fig. 1, so that the operation of the circuit need only briefly be herein described. The pulsed oscillator system 53 comprises two vacuum tubes 71 and 73, each, for example, of the triode type having respective plates or anodes 81 and 83, control-grid electrodes 91 and 93, and cathodes 101 and 103. The tube 73 forms a Hartley-type oscillator circuit with a parallel-connected capacitance C and inductance L, the grid 93 being connected through a coupling condenser 89 to the top terminal 79 of the LC circuit, the inductance L being tapped at an intermediate point and connected therefrom through a variable resistor 92 to the cathode 163, and the bottom terminal 89 of the LC circuit being connected to the negative side of the B or plate-voltage supply 99, which may, if desired, be grounded. The negative terminal of the plate supply 99 is connected to the positive terminal of a further power-supply system 105, labeled "C Supply." The grid 93 is returned through series-connected resistors 85 and 87 to the lower terminal 89 of the LC circuit, and a cathode resistor 95 is connected between the cathode 103 and the junction of resistors 85 and 87. The plate 83 of the tube 73 is directly connected to the positive terminal of the B power supply 99. The top terminal 79 of the tuned LC circuit is also directly connected with the cathode 101 of the second tube 71. The plate 81 of the tube 71 is connected through a load resistor 97 to the plate 83 of the tube 73.

Horizontal synchronizing pulses 61, Fig. 3, are received from the horizontal synchronizing pulse separator-and-amplifier 5, by a conductor 75, and fed across an input resistor 77 connected between the grid 91 and cathode 101 of the tube 71. Each of the positive horizontal synchronizing pulses 61 causes the tube 71 to conduct, to hold the LC circuit against oscillation. In the interval between successive pulses 61, the tube 71 is cut off and the LC circuit is permitted to oscillate, producing oscillations 63 at a frequency determined primarily by the values of L and C. The frequency of the train of oscillations 63 produced in response to each synchronizing pulse 61 may be adjusted by varying the condenser C or the inductance L, as is well known in the art. Appropriate settings of the variable resistor 92 will produce stable oscillations 63 or oscillations damped to any desired degree.

The oscillations 63 appearing at the grid 93 of the tube 73 are fed by means of a coupling condenser 107 to the grid 109 of a further triode vacuum tube 111. The grid 109 of the tube 111 is normally biased with respect to the cathode 115 by means of its connection through a grid resistor 119, that may be variable, to the negative terminal of the C supply 105. In such a biased condition the tube 111 is adapted to act as a clipper stage, or form of rectifier. The plate 113 of the tube 111 is directly connected to the positive terminal of the B power supply 99 and the cathode 115 of the tube 111 is returned to the negative terminal of the B supply 99, or to the positive terminal of the C supply 105 by a cathode resistor 117. The clipper tube 111, therefore, conducts only upon the positive cycles of the oscillations 63. The tube 111 performs also as a cathode follower, producing across the cathode load 117 the positive blanking impulses 65, Fig. 6, that are fed by conductor 118 to the cathode 21 of the cathode-ray tube 11. The cathode 21 is thus periodically driven positive by the successive trains of impulses 65 occurring during each horizontal scan 29, 31, 33, 35, etc., periodically cutting off or interrupting the electron beam, and thereby dividing the successive horizontal scans into similar closely spaced dots.

Since the video or television picture signals 52, Fig. 2, are meantime fed from the receiver 1, as by means of a coupling condenser 121, to the control grid 23 of the tube 11, in order to intensity-modulate the successive horizontal scans 29, 31, 33, 35, etc., with the picture signals 52, the successive modulated horizontal scans, constituting the television image, are sampled divided into a plurality of accurately and similarly positioned closely spaced dots too small to be individually discernible to the viewer. The control grid 23 may be held at any desired predetermined direct-current level by means of a D. C. restorer 123, shown connected between the negative terminal of the C power supply 105 and the grid 23, in series with a grid resistor 125.

The oscillations 63 could be used directly as blanking pulses, but since they are not unidirectional, the intensity of the electron beam impinging on the screen 19 would then be affected by portions of the oscillations 63. The clipper stage 111, however, provides flat regions between successive pulses 65, thus to permit the intensity of the electron beam to be determined solely by the received video signal 52.

The clipper stage 111 also affords a means of control over the ratio of the pulse width X to the pulse spacing Y of each of the blanking pulses 65, Fig. 6. This ratio is commonly called the duty cycle, and may be adjusted by means of the amount of bias developed across the grid resistor 119, from zero volts to a highly negative potential, the duty cycle being thus variable from a value of one-half to zero. The clipper, therefore, controls the horizontal width of the light areas or dots into which the horizontal scans are divided.

It is to be understood, of course, that instead of feeding positive blanking pulses 65 to the cathode 21, as before mentioned, negative pulses, shown at 67 in Fig. 7, may equally well be fed to the control grid 23. The negative pulses 67 of Fig. 7 may be produced, for example, by phase-inverting the output 65 of the clipper stage 111, or in a manner hereinafter discussed in connection with the embodiment of Fig. 11.

Inasmuch as the vertical width of the dark areas 69 between successive horizontal scans is predetermined in present-day television receivers by the rate of charging of the vertical sweep voltage produced in the vertical sweep generator 15, it is preferable, for purposes of uniformity, as before mentioned, that the horizontal spacing 43 between the light areas or dots 41, 45, 47, etc., of the horizontal scans be of the same order of magnitude as the said vertical width, and this may be effected, as above described, by suitably adjusting the bias on the clipper stage 111.

As an illustration of typical values, the horizontal synchronizing pulse separator-and-amplifier 5 may produce 525 triggering pulses for each pair of vertical synchronizing pulses produced by the vertical synchronizing pulse separator-and-amplifier 13, as in conventional television systems. On a standard ten-inch screen 19, therefore, 525 equally vertically displaced horizontal scans 29, 31, 33, 35, etc., will be produced in a rectangular area having a ratio of horizontal width to vertical height of about four to three. The pulse-recurrence frequency of the horizontal synchronizing pulses may have a value of about 15,750 cycles per second to produce this two-dimensional display, the period of the successive horizontal sweeps being about 64 microseconds. If each horizontal scan, therefore, is to be divided into, for example, 700 dots, such as the dots 41, 45, 47, 49, etc., of the horizontal scan 29, then the horizontal width of each dot 41, 45, 47, 49, etc., must have a time duration of about a little less than one-tenth of a microsecond. To accomplish this end, the tuned LC circuit of the pulsed oscillator 53 will have a resonant frequency of about 11 megacycles.

The system comprising the pulsed oscillator 53 and clipper stage 111 of Fig. 1 readily lends itself to the form of a modification kit that may be installed in present-day television receivers. The circuits may, of course, also be built into the receivers when they are manufactured.

The clipper stage 111 of Fig. 1 is designed particularly for use where there is alternating-current coupling of the video signal 52 through the condenser 121 to, for example, the control grid 23 of the kinescope 11. In the modification of Figs. 9, 10 and 11, circuits are disclosed that replace the clipper stage 111 of Fig. 1, and permit the use of the present invention even where there is a direct-current connection from the receiver 1 to the grid 23 of the cathode-ray tube 11.

In the system of Fig. 9, the grid 23 of the cathode-ray tube 11 is shown directly connected to a conductor A. The conductor A is the same conductor A shown in Fig. 1, connecting the receiver 1 and the control grid 23, but without the coupling condenser 121. In the system of Fig. 9, therefore, the video signal 52 is fed directly to the grid 23. The conductors B and C are the same conductors B and C of Fig. 1, respectively connected to the plate 83 and to the grid 93 of the oscillator tube 73. In place of the clipper tube 111, however, is a vacuum tube 129, preferably of the pentode type, having a plate 131, a suppressor grid 133, a screen grid 135, a control grid 137 and a cathode 139. The conductor C feeds the oscillations 63 from the grid 93 of the oscillator tube 73, Fig. 1, through the coupling condenser 107 to the grid 137 of the tube 129. The grid 137 is connected through the grid resistor 119 to the negative terminal of the C power supply 105 in order to provide bias, as discussed in connection with the clipper stage 111 of Fig. 1. The cathode 139 of the tube 129 is shown directly connected to the negative terminal of the B power supply 99, and the suppressor grid 133 is shown strapped to the cathode 139. The conductor B from the plate 83 of the pulse oscillator tube 73, Fig. 1, is connected to the upper terminal of the primary of a transformer 141. The lower terminal of the transformer primary is connected to the plate 131 of the tube 129. The screen grid 135 is also connected to the conductor B which receives plate voltage from the positive terminal of the B power supply source 99. The secondary of the transformer 141 is shown connected through a rectifier 143 across a resistor 145. The junction of the rectifier 143 and the resistor 145 is connected to the cathode 21 of the cathode-ray tube 11. The junction of the lower terminal of the secondary of the transformer 141 and the resistor 145 is connected to a potentiometer slider 147 that provides any desired direct-current voltage on the cathode 21, through the medium of a voltage dividing network 149, 151 connected between the plus and minus terminals of the B power supply 99. The slider 147 is provided with a by-pass condenser 153 to by-pass to the negative terminal of the 8 power supply 99, fluctuating voltages produced as the slider 147 is varied.

The tube 129 in the circuit of Fig. 9, therefore, acts as a clipper in the same manner as the triode 111 of Fig. 1, producing at the plate 131 of the clipper tube 129, negative unidirectional pulses 67, Fig. 7, that may be inverted to positive pulses 65, Fig. 6, in the secondary of the transformer 141 before application as blanking pulses to the cathode 21 of cathode-ray tube 11. The phase-reversal or phase-inverting transformer 141, when used with the clipper tube 129, permits economical operation of the tube 129, with negative pulses appearing at the plate 131. If this feature were not employed, the tube 129 would have to draw excessive steady current, since the blanking pulses 65 or 67 are short compared to the interval between the pulses. The rectifier 143 is included to insure a constant direct-current level between blanking pulses 65 irrespective of variations that may occur in the pulse amplitude. The rectifier 143 may, however, be omitted as when, for example, shorted by the switch S, though such operation is subject to somewhat of a disadvantage in that variations in the level of the oscillations 63 vary the level of the flat portion between the blanking pulses 65 or 67.

While the circuit of Fig. 9 was before described as adapted for use where the video signal 52 is direct-current coupled to the cathode-ray tube 11, it may, of course, be used also where a coupling condenser is employed to couple the video signal 52 to the cathode-ray tube 11.

The system of Fig. 10 is likewise adapted for use either with alternating- or direct-current coupling of the video signal 52 along the conductor A to the grid 23 of the tube 11. In this modification, the plate 155 of a tetrode clipper tube 152 is shown connected by the conductor A to the grid 23 of the cathode-ray tube 11 instead of to the cathode 21, so that both the video signal 52 fed along conductor A and the blanking pulses 67, Fig. 7, are fed together to the control-grid electrode 23. The screen grid 157 of the tube 152 is connected to the positive terminal of the B supply 99 as is the plate 155, through a load resistor 163 connected between plate 155 and the screen grid 157. For proper operation of this mixed feed of video signals and blanking pulses, the resistor 163 would be considerably smaller than is normally the case for the output load of the television receiver circuit 1. In order to provide proper matching, therefore, it would be desirable in the embodiment of Fig. 10 to employ a larger receiver output tube than is conventionally employed in present-day television receiver circuits. The advantage of the modification of Fig. 10, however, is that in certain cathode-ray tubes, modulation of the cathode can lead to de-focusing and deflection troubles. The circuit of Fig. 10, however, feeds the modulating and blanking voltages only to the control grid 23.

In the modification of Fig. 11, the advantages of the system of Fig. 10 are provided without the disadvantageous feature of the small receiver output load resistor 163. The clipper tube 111 of Fig. 1 is employed with precisely the same input and output connections as before described in connection with Fig. 1, except that the output pulses 65 appearing across the cathode load 117 of the clipper tube 111, instead of being fed directly to the cathode 21 of the cathode-ray tube 11, are fed by conductor 118 to the control-grid electrode 165 of a vacuum tube 167, preferably of the triode type. The triode 167 forms a mixing circuit with a similar triode 169 which may, if desired, be the second half of a dual-triode envelope embodying both the tubes 167 and 169. The control grid 171 of the tube 169 is connected to the previously described conductor A leading from the television receiver 1. The plate 173 of the tube 169 receives its plate voltage from the positive terminal of the B supply source 99, as does the plate 175 of the other tube 167 through a plate load resistor 177. The cathodes 179 and 181 of the tubes 169 and 167 are connected together and are provided with a common cathode load 183 which connects to the negative side of the B power supply 99. Since the video signals 52 are fed by conductor A to the grid 171 of the tube 169, and since the blanking pulses 65 are fed by conductor 118 to the grid 165 of the tube 167, there will appear in the plate load 177 both the video signals 52 and inverted blanking pulses 67 that may both operate on the control grid 23, as discussed in connection with Fig. 10.

The present invention is not, however, limited to periodically extinguishing the electron beam along successive horizontal scans by feeding the blanking pulses directly to the cathode-ray-tube electrodes. The blanking pulses may, for example, be used to interrupt the video signals 52 before they reach the cathode-ray tube as, for example, in the radio-receiving circuits such as in the radio-frequency stages of the receiver 1, or more advantageously, in the intermediate-frequency stages. In Fig. 12, for example, the pulsed oscillator 53 and clipper stage 111 of Fig. 1 are shown connected by means of a switch S' either to inject the blanking pulses into the radio-frequency circuits, or into the intermediate-frequency circuits. The only differences between the circuit diagrams of the pulsed oscillator 53 and clipper stage 111 shown in Figs. 1 and 12, reside in the showing in Fig. 12 of the tubes 71 and 73 as beam-power tetrodes and not triodes. The respective screen-grid electrodes 185 and 187 are decoupled to ground through respective condensers 189 and 191 and are connected to the B power supply 99 positive terminal through dropping resistors 193 and 195. The receiver 1, shown in a single block in Fig. 1, is illustrated more in detail in Fig. 12 as comprising radio-frequency amplifying stages 197 that amplify the input signal from the antenna 3, a mixer or first detector 199 that mixes the amplified radio-frequency signals with oscillations from a beating local oscillator 201 to form an intermediate-frequency, intermediate-frequency amplifying stages 203 and a second detector 205 for applying the rectified video signals 52 to video amplifiers, not shown, that, in turn, connect through conductor A to the cathode-ray tube 11. The horizontal and vertical synchronizing pulse separators 5 and 13 of Fig. 1 are shown in Fig. 12 in a common box 207, though it is to be understood that the output lead 75 therefrom is the same as that in Fig. 1, feeding the horizontal synchronizing pulses 61 to the control grid 91 of the tube 71. The cathode load 117 of the clipper stage 111 is shown connected by conductor 118 through the switch S′ either to a modulator 209 or to a modulator 211 that may, for example, take the form of the modulator or mixing tubes 167, 169 of Fig. 11, or any other well-known form. The blanking pulses 65 thus fed to the modulator 209, as shown in Fig. 12, are mixed with the intermediate-frequency signals fed from, for example, the first intermediate-frequency amplifier of the intermediate-frequency stages 203, thereby producing an output comprising the intermediate-frequency signals and the blanking pulses. This output may then be amplified in the remaining intermediate-frequency stages for application to the second detector 205. The output of the second detector 205, therefore, will comprise detected video signals periodically broken up or reduced to zero voltage or to some other reference level, corresponding to the pulses 65 or 67, as shown at 204. Similarly, if the switch S′ is thrown to the left in Fig. 12, the blanking pulses 65 may be mixed in the modulator 211 with the radio-frequency signals, and the mixed or modulated resulting signals may be fed to the remaining radio-frequency amplifying stages or directly to the mixer 199 for producing an intermediate-frequency that will contain the video signal modulation broken up by the blanking pulses 65 or 67. In much the same fashion, the local oscillations of the oscillator 201 in the radio-receiving circuits may be broken up, or the blanking pulses may be fed to any of the receiver circuits or to any of the voltage supplies thereof, to produce in the conductor A, feeding the cathode-ray tube 11, a video signal broken up or sampled in the fashion described and illustrated at 204.

Though the systems of Figs. 1, 9, 10, 11 and 12 have been described in connection with blanking pulses formed by pulsing an oscillator to produce a train of oscillations for each horizontal scan, it is to be understood that the oscillations may also, if desired, be triggered by the vertical synchronizing pulses to produce a long train of oscillations for the operation of the complete frame of horizontal scans, thereby also to blank the successive horizontal scans. In Fig. 13, for example, the vertical synchronizing pulse separator-and-amplifier 13 of Fig. 1 is shown feeding its conventional serrated vertical synchronizing pulses 213 to a pulse-sharpening circuit such as a relaxation oscillator 215 of, for example, the multi-vibrator or blocking oscillator form, to produce sharp voltage impulses from the serrated synchronizing pulses. The relaxation oscillator 215 will be triggered by the vertical synchronizing pulse 213 at some particular moment, shown at 219, in the same manner as the vertical sweep generator 15 is triggered i nFig. 1. The relaxation oscillator 215, however, may be provided with a time constant such that it produces a long pulse 217 corresponding to the period between successive vertical synchronizing pulses 213, which, in turn, corresponds to the frame period of all the horizontal-line scans of the television picture. The sharp pulses 219 thus formed in the relaxation oscillator 215 may then trigger the pulsed oscillator 53 in the same manner as described in connection with the embodiment of Fig. 1 and the various other embodiments, to produce a long train of oscillations during the whole vertical scan period or frame. While the serrated vertical synchronizing pulses 213 may be used directly to trigger the pulsed oscillator 53 in order to produce a train of oscillations for the duration of the vertical scan, it is preferable to employ the relaxation oscillator 215 to provide sharp triggering pulses. The output lead 119 from the clipper tube 111, therefore, will contain blanking pulses 65 that occur during the whole vertical scan period so that the pulses will break up all of the successive horizontal scans produced during the vertical scan period. Though the successive horizontal scans will not be broken up into evenly aligned rows and columns of dots in this manner of operation, each horizontal scan will, none-the-less, be broken up the same way each vertical frame. In the same manner, the vertical synchronizing pulses, instead of the horizontal synchronizing pulses, may be used to trigger the pulsed oscillator in the other embodiments of the invention.

Though it is deemed perferable to produce the blanking pulses at the television receiver with the aid of circuits of the character described, it is possible to produce the blanking pulses at the television transmitter, Fig. 14, and to transmit the blanking pulses with the video-signal modulation. Such operation may require the widening of present-day receiver bandwidths to accommodate the sharp blanking pulses, but the receivers need not be otherwise modified.

While the present invention has been described as applied to television systems, the novel method and the preferred systems herein disclosed are not limited to television, but are clearly equally adaptable to any type of cathode-ray-tube display system.

Modifications will occur to those skilled in the art, and all such are considered to fall within the spirit and scope of the present invention, as defined in the appended claims.

What is claimed is:

1. A cathode-ray-tube presentation system having, in combination, a cathode-ray tube provided with a screen, means for producing an electron beam for impinging on the screen and means for producing impulses for synchronizing horizontal and vertical scanning of the screen by the electron beam, a shock-excited oscillator, means for connecting the shock-excited oscillator to the horizontal - scanning - synchronizing - impulse-producing means to pulse the oscillator into shock-excited oscillation in order to produce a train of gradually damping oscillations synchronously with the initiation of the horizontal scan of the screen by the electron beam, means for uni-directionalizing the oscillations of the oscillator to produce a train of short direct-current electron beam blanking pulses, and means for applying the blanking pulses to the electron-beam-producing means periodically to blank the electron beam during each horizontal scan of the screen, thereby to cause the blanked portions of each successive horizontal scan to occur in vertical alinement.

2. A system as claimed in claim 1 and in which the period of oscillation of the shock-excited oscillator is slightly less than one-tenth of a microsecond.

References Cited in the file of this patent

UNITED STATES PATENTS

| Number | Name | Date |
| --- | --- | --- |
| 2,034,704 | Nakashima et al. | Mar. 24, 1936 |
| 2,093,157 | Nakashima et al. | Sept. 14, 1937 |
| 2,134,094 | Andrieu | Oct. 25, 1938 |
| 2,241,204 | Keyston et al. | May 6, 1941 |
| 2,401,573 | Kozanowski | June 4, 1946 |
| 2,479,880 | Toulon | Aug. 23, 1949 |

FOREIGN PATENTS

| Number | Country | Date |
| --- | --- | --- |
| 546,462 | Great Britain | July 15, 1942 |